Aug. 26, 1969     V. A. PAGLEY     3,463,537
TRANSPORTABLE SHOE SHINE STAND
Filed June 29, 1967
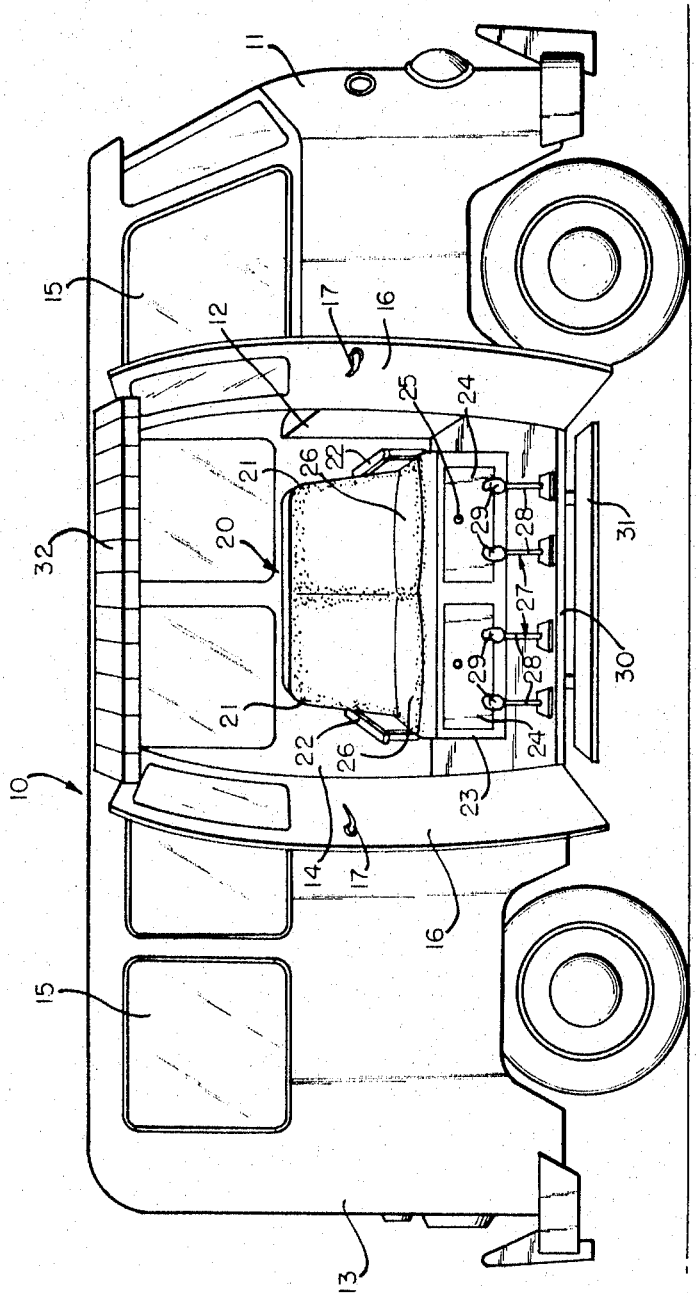
INVENTOR
Victor A. Pagley
BY *Frank C Maley*
Agent

United States Patent Office 3,463,537
Patented Aug. 26, 1969

3,463,537
TRANSPORTABLE SHOE SHINE STAND
Victor A. Pagley, 719 Franklin Ave.,
Steubenville, Ohio 43952
Filed June 29, 1967, Ser. No. 650,112
Int. Cl. B62d 63/00, 39/00
U.S. Cl. 296—1                                         1 Claim

ABSTRACT OF THE DISCLOSURE

The combination of a motor vehicle having a relatively high floor and a double side opening door, and a shoe shine stand positioned interiorly of the vehicle facing the door and readily accessible from the exterior of the vehicle.

BACKGROUND OF THE INVENTION

Shoe shine stands of various kinds have heretofore been known, but have been subject to the difficulty of permanent location, the stands being relatively heavy and cumbersome. Rental of space has thus been necessary.

FIELD OF THE INVENTION

The instant invention has as its primary object the provision of a mobile or readily transportable shoe shine stand, and accomplishes this by combining such a stand with a motor vehicle of the type having a relatively high floor and a wide side opening door, the stand being so positioned that the shoes of those seated on the stand are readily accessible to an operator standing exteriorly of the vehicle, the operator being protected by a detachable awning.

THE PRIOR ART

Efforts have heretofore been made to provide a mobile stand, as for example that shown in Patent No. 1,174,-424 to Kennedy, dated Mar. 7, 1916. However, in this patent the range was limited since the device was manually moved, unstable, uncovered and awkward to mount and dismount.

SUMMARY OF THE INVENTION

The instant invention obviates the above difficulties by the provision of a motor vehicle within which the stand is positioned adjacent a wide side opening door provided with a removable step so that the user mounts the stand without difficulty, and is seated in comfort in inclement weather in a position so that his shoes are readily accessible to the shine boy or operator.

DESCRIPTION OF THE DRAWING

The single figure of the drawing discloses a side elevation of a motor vehicle with the doors open, showing a front view of the stand in position for use.

DESCRIPTION OF A PREFERRED EMBODIMENT OF THE INSTANT INVENTION

Referring now to the drawing in detail, there is generally indicated at 10 a motor vehicle of generally conventional type having a front end 11 with a driver's seat 12 and the usual control components (not shown). The motor is preferably in the rear end 13. This type of vehicle is characterized by a large interior space 14 and multiple side windows 15. A pair of side opening doors 16 are provided opening outwardly and hinged to the opposite side of the door frame in any conventional manner. Internal and external door opening handles 17 are provided.

Interiorly of the vehicle, in a position facing the door is a shoe shine stand generally indicated at 20 consisting of a pair of adjacent seats 21 preferably provided with outer side arms 22 mounted on a rectangular base 23 within which are a pair of slidable drawers 24 opening toward the front and provided with handles 25. The drawers contain the usual shoe polish, cleaner, brushes, rags, etc. employed in cleaning and polishing shoes. The seat and back may be upholstered or provided with cushions 26 if desired.

Placed in front of each seat 21 is a pair of foot stands 27, each consisting of a pedestal 28 and foot rest or support 29. These stands face outwardly and are located immediately adjacent the bottom edge 30 of the door frame. The floor 33 of the vehicle is relatively high, so that shoes placed on the foot stands are conveniently accessible for polishing.

A reversible or foldable step 31 facilitates access to the interior of the vehicle and the seats for customers. A removable or foldable awning 32 is positioned directly above the door opening and extends outwardly for the protection of the operator.

In the use and operation of the stand the vehicle is driven to a suitable location and parked adjacent the curb. The doors 16 are opened, the step 31 and awning 32 are suitably adjusted, and the stand is ready for business. In the event that business is slow, the operator may readjust the step and awning, close doors 16 and move to a more active location. The operator may select a particular locality for daily operation, or different localities for different times of the day.

The mobile stand is of particular utility in serving persons appearing at special events, such as a sporting event, or outside a theater, or large public affair of any sort, in that it may be readily moved to a desired situation as required at a specific time.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. In combination with a motor vehicle having a panel-type body provided with a roof, a floor and a vertical panel formed with an opening that is provided with an outwardly opening door closure arrangement, a shoe shine stand assembly comprising a base mounted on the floor within the body and having an apertured front wall spaced inwardly from and facing the opening in the panel, at least one seat mounted on the base and facing the opening, at least one drawer slidable in the base within the front wall aperture thereof and adapted to contain shoe shine materials, foot supporting stands mounted on the floor within the interior of the body and disposed in front of the front wall of the base and in front of the seat so as to accommodate the feet of an occupant of the seat, a movable step carried by the body and positionable in a substantially horizontal position below the floor and extended from the panel in front of the opening when the door closure arrangement is open and a removable roof extension projecting from the roof and overlying the step when the door closure arrangement is open.

References Cited

UNITED STATES PATENTS

| | | | |
|---|---|---|---|
| 651,446 | 6/1900 | Putman | 15—265 |
| 426,224 | 4/1890 | Browne | 15—265 |
| 1,327,248 | 1/1920 | Moody | 296—24 X |

PHILIP GOODMAN, Primary Examiner

U.S. Cl. X.R.

15—265.